US009780516B2

(12) United States Patent
Chen et al.

(10) Patent No.: US 9,780,516 B2
(45) Date of Patent: Oct. 3, 2017

(54) POWER INTERCONNECTION WITH CURRENT SURGE MITIGATION

(71) Applicant: International Business Machines Corporation, Armonk, NY (US)

(72) Inventors: Henry Chen, Taipei (TW); Jung-Tai Chen, Taipei (TW); Ko-Chen Tan, Taipei (TW); Claire Tsai, Taipei (TW); Chia-Yen Wu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 14/588,548

(22) Filed: Jan. 2, 2015

(65) Prior Publication Data

US 2015/0188266 A1 Jul. 2, 2015

(30) Foreign Application Priority Data

Jan. 2, 2014 (TW) .................................. 103100041

(51) Int. Cl.
*H01R 13/66* (2006.01)
*H01R 43/26* (2006.01)
(Continued)

(52) U.S. Cl.
CPC ......... *H01R 43/26* (2013.01); *H01R 13/6616* (2013.01); *H01R 24/78* (2013.01);
(Continued)

(58) Field of Classification Search
CPC H01R 13/6616; H01R 31/065; H01R 13/641; H01R 13/68; H01R 13/713; H01R 13/6485; H01R 13/6666
(Continued)

(56) References Cited

U.S. PATENT DOCUMENTS 4,118,690 A * 10/1978 Paynton ............. H01R 13/7177
324/508
4,995,017 A * 2/1991 Sellati ................ H01R 13/7038
307/125
(Continued)

FOREIGN PATENT DOCUMENTS

JP 3385506 B2 3/2003
TW 200903962 A 1/2009
(Continued)

OTHER PUBLICATIONS

Samii, Mehdi, and Kaushik Das. "Inverter Inrush Current Protection." Inrush Current Limiters. Ametherm, Oct. 25, 2013. Web. Aug. 25, 2016.*

(Continued)

*Primary Examiner* — James Harvey
*Assistant Examiner* — Matthew T Dzierzynski
(74) *Attorney, Agent, or Firm* — Yee & Associates, P.C.; Steven Bennett

(57) ABSTRACT

Disclosed is an apparatus for power interconnection, adapted for use between a main connector and a DC main. The power connector has a connector power terminal and the DC main has a DC main power terminal. The apparatus includes an apparatus power terminal for being electrically coupled to the DC main power terminal in response to the apparatus in connection with the DC main; a first conductor including a resistor and a conductive contact, the conductive contact being electrically coupled to the resistor; and a second conductor, the resistor being electrically coupled to the second conductor, wherein, in response to an action of the power connector in connection with the apparatus, the connector power terminal contacts the conductive contact and a first current flowing therethrough is limited by the (Continued)

resistor. A receptacle structure for power interconnection is also disclosed.

12 Claims, 4 Drawing Sheets

(51) Int. Cl.
*H01R 24/78* (2011.01)
*H02H 9/02* (2006.01)
*H01R 13/641* (2006.01)
*H01R 31/06* (2006.01)

(52) U.S. Cl.
CPC .............. *H02H 9/02* (2013.01); *H01R 31/06* (2013.01); *Y10T 29/49208* (2015.01)

(58) Field of Classification Search
USPC ............. 361/1, 220, 56; 439/620.01, 620.21, 439/620.3
See application file for complete search history.

(56) References Cited

U.S. PATENT DOCUMENTS

| | | | |
|---|---|---|---|
| 5,876,250 A * | 3/1999 | Deng | H01R 13/68 439/620.3 |
| 5,946,180 A * | 8/1999 | Simpson | H01R 13/7039 307/126 |
| 6,405,089 B1 | 6/2002 | Aizaki | |
| 6,659,783 B2 | 12/2003 | Copper et al. | |
| 6,683,766 B1 | 1/2004 | Guo et al. | |
| 6,896,554 B2 * | 5/2005 | Beideman | H01R 13/68 439/606 |
| 7,193,837 B1 * | 3/2007 | Epstein | H01R 4/66 361/220 |
| 7,298,627 B2 | 11/2007 | Hussaini et al. | |
| 8,179,147 B2 | 5/2012 | Dargatz et al. | |
| 8,218,274 B2 | 7/2012 | Hastings et al. | |
| 8,814,600 B2 * | 8/2014 | Watanabe | H01R 13/6666 439/620.09 |
| 2002/0085399 A1 | 7/2002 | Brooks et al. | |
| 2003/0082952 A1 * | 5/2003 | Miles | H02M 7/003 439/620.01 |
| 2007/0271403 A1 | 11/2007 | Kojori | |
| 2010/0078998 A1 | 4/2010 | Wei et al. | |
| 2010/0279532 A1 | 11/2010 | Inage et al. | |
| 2013/0286586 A1 * | 10/2013 | Hussaini | H02J 7/0042 361/695 |
| 2015/0270675 A1 | 9/2015 | Chen et al. | |

FOREIGN PATENT DOCUMENTS

| | | |
|---|---|---|
| TW | M454032 U | 5/2013 |
| WO | WO2009082001 A1 | 7/2009 |

OTHER PUBLICATIONS

Chen et al., "Power Interconnection with Current Surge Mitigation," U.S. Appl. No. 14/734,479, filed Jun. 9, 2015, 29 pages.

Ahn et al., "DC Appliance Safety Standards Guideline through Comparative Analysis of AC and DC Supplied Home Appliances," Journal of Electrical Engineering & Technology, vol. 7, No. 1, Jan. 2012, pp. 51-57.

Davies, "Development of a DC Appliance Connector for Telecommunications Equipment," Anderson Power Products, Jan. 2011, 7 pages.

Office Action, dated May 9, 2017, regarding U.S. Appl. No. 14/734,479, 12 pages.

* cited by examiner

POWER INTERCONNECTION WITH CURRENT SURGE MITIGATION

This application is based on and claims the benefit of priority from Taiwan Patent Application 103100041, filed on Jan. 2, 2014.

BACKGROUND OF THE INVENTION

Field of the Invention

The present invention relates to power supply apparatuses, and more particularly, to a power interconnection apparatus for a power supply.

Description of the Prior Art

In general, depending on different considerations, such as country, region, power source, efficiency, and power distribution, electrical outlet apparatuses installed at various venues supply AC mains or DC mains. From the perspective of an AC power supply (or AC adapter, charger) of an apparatus, voltage generated from a transformer, for example, supplies the required main voltage to the apparatus. The technology whereby an AC main supplies main voltage to an AC power supply through a power line is well-known and mature. However, the technology whereby a DC main supplies main voltage to an AC power supply through a power line is bottlenecked.

Unlike an AC main, a DC main usually uses a large capacitance for maintaining a stable voltage level. Take a DC main with a large capacitance as an example, it has a large capacitance of 9000 uF for maintaining a stable direct current (DC) voltage, thereby leading to a large DC inrush current. A large DC inrush current is one of the major reasons why DC arcing damage happens between a DC main receptacle and main plug of a power supply.

AC mains are not equipped with large capacitors for various reasons as follows: capacitors cause phase shift, cause a reduction in ground impedance, and thus increase leak current, wherein the reduction in ground impedance brings about additional power loss.

Theoretically speaking, it is feasible for a DC main to supply main voltage to an AC power supply. In doing so, however, the resultant DC arcing poses severe problems. For instance, when plugged into the receptacle of a DC main, a main plug with an AC power supply sustains a surge of potential difference and an abrupt decrease of the distance between two terminals and thus is predisposed to terrific electric arcs or sparks. The sparks are accompanied by heat to thereby melt related components (because of a large current), and in consequence the sparks cause an apparatus, its parts and components, and contacts, to burn, deteriorate, experience problems with reliability and safety, and end up with a shortened service life.

In view of the aforesaid considerations, the prior art pertaining to a main plug of an apparatus or AC power supply is reluctant to support DC mains for the sake of security.

SUMMARY OF THE INVENTION

When it comes to a DC main supplying power to an AC power supply, the prior art has drawbacks.

In view of the aforesaid drawbacks of the prior art, the present invention provides a power interconnection apparatus which prevents related damage and an electric arc otherwise produced because a DC main supplies power to an AC power supply, ensures that the DC main supplies power to an apparatus or AC power supply, and thus enhances safety.

Furthermore, the present invention prevents related damage and an electric arc otherwise produced because of a large DC inrush current, thereby extending service life.

In an embodiment, an apparatus for power interconnection, adapted for use between a main connector and a DC main, is provided. The main connector has a connector main terminal, and the DC main has a DC main terminal. The power interconnection apparatus includes:
- an apparatus main terminal electrically coupled to the DC main terminal in response to the power interconnection apparatus being connected to the DC main;
- a first conductor comprising a resistor and a conductive contact electrically coupled to the resistor; and
- a second conductor electrically coupled to the resistor of the first conductor;
- wherein, in response to an action in which the main connector gets connected to the power interconnection apparatus, the connector main terminal comes into contact with the conductive contact, and a first current passing through the first conductor is restricted by the resistor.

Particularly, the conductive contact dangles in response to the main connector not being connected to the power interconnection apparatus.

The power interconnection apparatus may further include an apparatus casing, wherein the apparatus casing has an apparatus casing hole whereby the connector main terminal is mounted and dismounted through the apparatus casing hole. In response to an action in which the connector main terminal is inserted into the apparatus casing hole and positioned at the apparatus casing hole, the conductive contact comes into contact with the connector main terminal, such that the first current passes through the first conductor.

In another embodiment, a receptacle structure, adapted to supply a direct current to a main connector having a connector main terminal, is provided. The receptacle structure includes:
- a DC main terminal for supplying the direct current;
- a first conductor comprising a resistor and a conductive contact electrically coupled to the resistor; and
- a second conductor electrically coupled to the DC main terminal;
- wherein the resistor of the first conductor is electrically coupled to the second conductor, wherein, in response to an action in which the main connector being connected to the DC receptacle, the connector main terminal comes into contact with the conductive contact, and a first current passing through the first conductor is restricted by the resistor.

In yet another embodiment, a method of supplying a direct current, adapted for use between a main connector and a DC main, is provided. The method includes the steps of:
- providing the main connector comprising a connector main terminal;
- providing the DC main, wherein the DC main comprises:
  - a DC main terminal for supplying the direct current;
  - a first conductor comprising a resistor and a conductive contact electrically coupled to the resistor; and
  - a second conductor, wherein an end of the second conductor is electrically coupled to the DC main terminal, and wherein the resistor of the first conductor is electrically coupled to the second conductor; and causing the main connector to connect with the DC receptacle;

wherein, in response to the main connector being connected to the DC receptacle instantaneously, the connector main terminal comes into contact with the conductive contact, and a first current passing through the first conductor is restricted by the resistor.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The following description, the appended claims, and the embodiments of the present invention further illustrate the features and advantages of the present invention.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE EMBODIMENTS

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Figure 1:
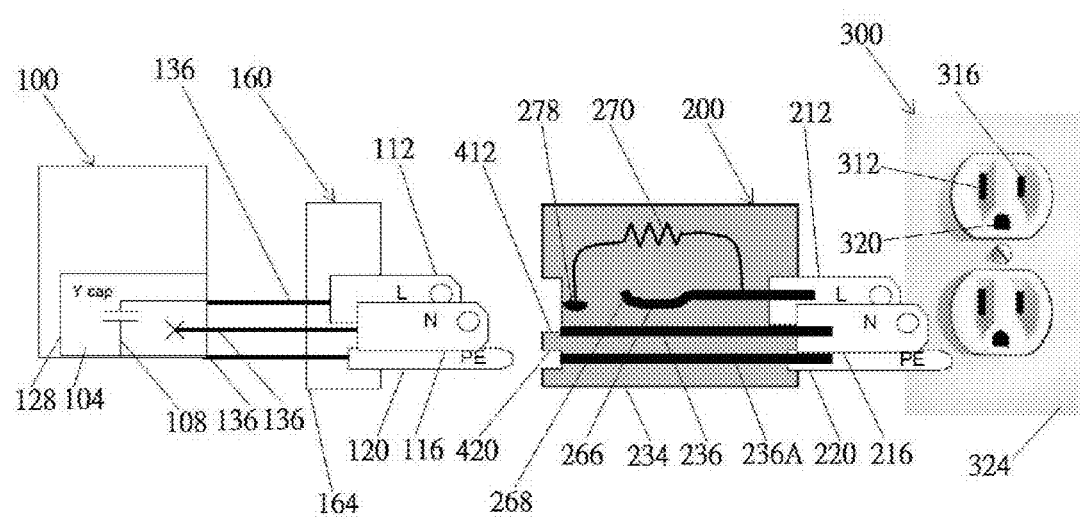
FIG. 1 is a schematic view of the structure of a power interconnection apparatus according to a preferred embodiment of the present invention.

Referring to FIG. 1, there is shown a schematic view of a power interconnection apparatus 200 according to a preferred embodiment of the present invention. FIG. 1 further shows an apparatus 100 and a DC receptacle 300. The apparatus 100 includes various power-driven apparatuses, such as a notebook computer, a tablet, a DVD player, a monitor, a portable electronic apparatus, a mobile phone, a PDA, a server, a home appliance, a measurement instrument, a desktop computer, and an industrial computer, but the present invention is not limited thereto. The apparatus 100 comprises a power supply 104, such as an AC power supply. Take an AC power supply as an example, it has an AC power supply casing 128 and a main connector 160, such as a plug for use with an AC power supply. In this preferred embodiment, capacitance Y 108 of the AC power supply is denoted with $C_y$, 4.7~6.8 uF, and adapted to filter out noise. The main connector (plug) 160 is factory-designed to function as an AC plug (such as IEC60320 plug) for use with external AC main input. The main connector (plug) 160 comprises a plug body 164 and a plurality of connector main terminals 112, 116, 120 electrically connected to the power supply 104 through a plurality of conductors 136. The connector main terminals 112, 116, 120 are L (line) terminal, N (neutral) terminal, and PE (protective earth) terminal, respectively.

The DC receptacle 300 is connected to a DC main, such as a solar power main, a battery main, or a capacitance, or a main for supplying power through a main adaptive apparatus. The DC receptacle 300 is, for instance, disposed at an indoor or outdoor electrical outlet or a main extension, but the present invention is not limited thereto. The DC receptacle 300 is designed for use with an AC plug (or DC main as appropriate.) The DC receptacle 300 comprises a receptacle casing 324 and a plurality of DC main terminals (not shown). The receptacle casing 324 forms at least a receiving chamber (not shown) for receiving the plurality of DC main terminals. The plurality of DC main terminals are a positive (+) terminal, a negative (−) terminal, and a protective earth (PE) terminal, respectively. Regarding a plurality of DC main terminals, the apparatus main terminals 212, 216, 220 of the power interconnection apparatus 200 can be freely mounted and dismounted, provided that receptacle casing holes 312, 316, 320 are aligned with apparatus main terminals 212, 216, 220, respectively, such that the DC main terminals can be electrically connected to the apparatus main terminals 212, 216, 220 of the power interconnection apparatus 200. The details and structures of the power supply 104, the main connector (plug) 160, and the DC receptacle 300 are identical to that of their conventional counterparts and thus are not described herein for the sake of brevity.

The power interconnection apparatus 200 comprises an apparatus casing 234 and a plurality of apparatus main terminals 212, 216, 220 disposed in a manner to protrude from the apparatus casing 234. The apparatus main terminals 212, 216, 220 are a line (L) terminal, a neutral (N) terminal, and a protective earth (PE) terminal, respectively. As mentioned before, the apparatus main terminals 212, 216, 220 can be freely mounted on, dismounted from, electrically connected to, and electrically disconnected from the receptacle casing holes 312, 316, 320, respectively. The apparatus casing 234 further has a plurality of conventional apparatus casing holes 412, 420 whereby connector main terminals 112, 116, 120 of the main connector (plug) 160 are freely mounted and dismounted through the apparatus casing hole 412, an apparatus casing hole (not shown), and the apparatus casing hole 420, respectively, to therefore get electrically connected to the power interconnection apparatus 200. The apparatus casing 234 contains a plurality of conductors 236, 236A. After the conductors 236, 236A have been insertedly disposed in an apparatus casing hole (not shown) and the apparatus casing hole 420, through the connector main terminals 116, 120, respectively, the conductor 236A gets electrically connected to the apparatus main terminal 220 and the connector main terminal 120, whereas the conductor 236 gets electrically connected to the apparatus main terminal 216 and the connector main terminal 116.

Figure 2:
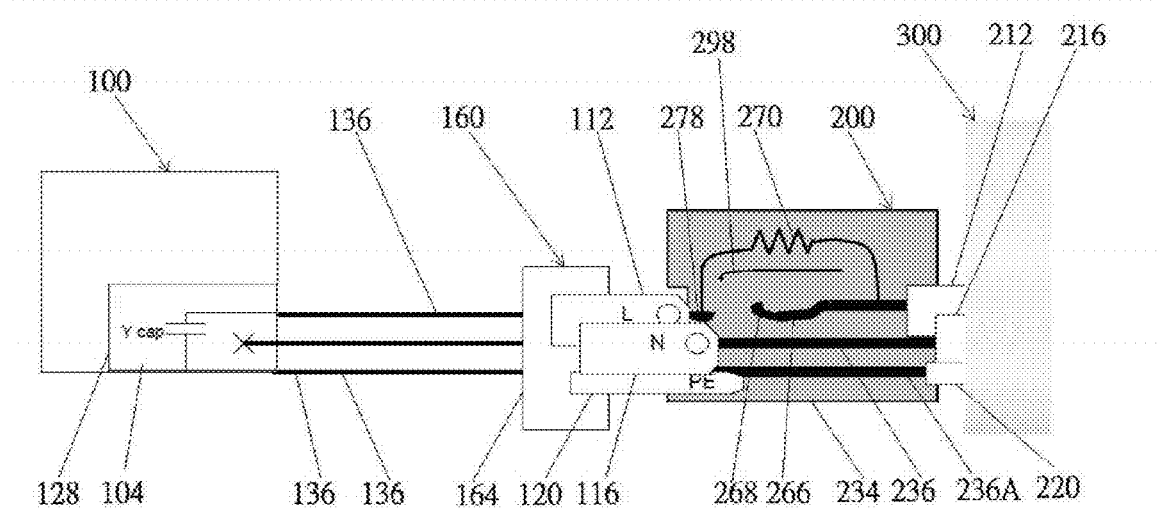
FIG. 2 is a schematic view of the operation of the power interconnection apparatus according to a preferred embodiment of the present invention.
Figure 3:
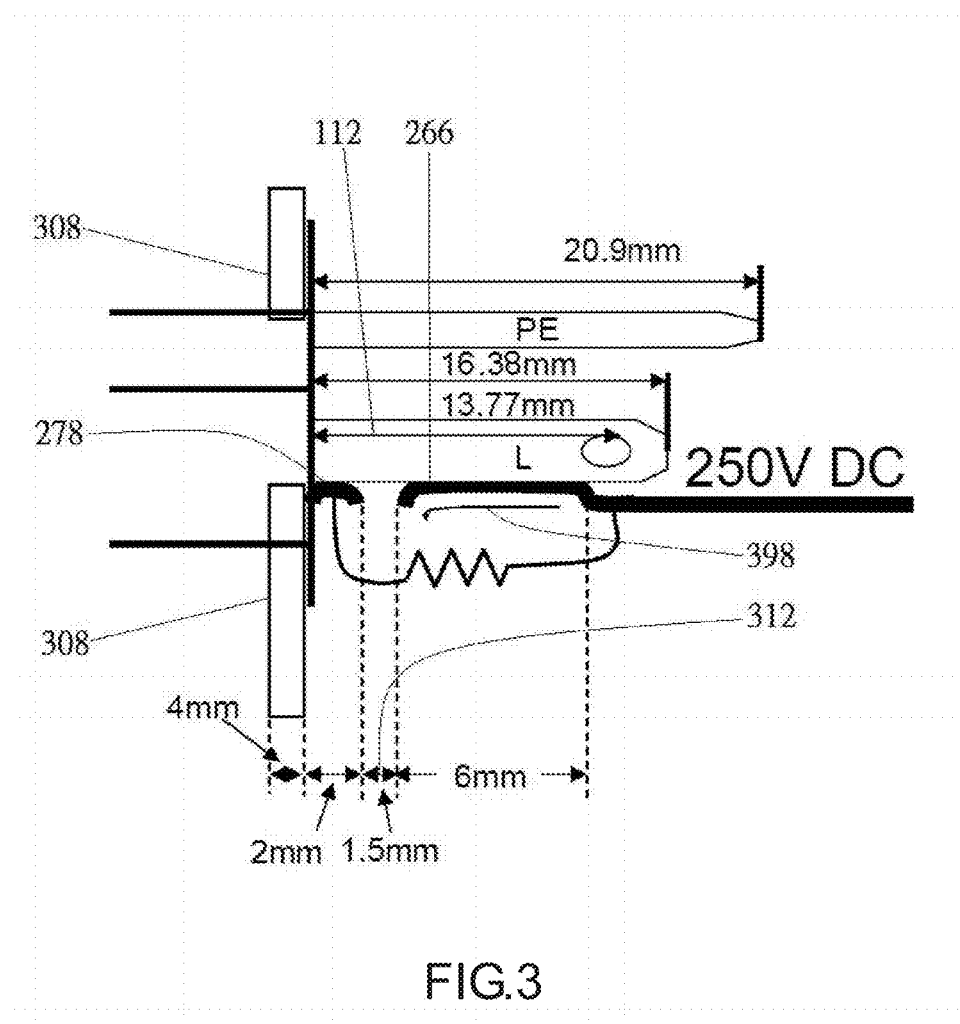
FIG. 3 is a schematic view of the operation of the power interconnection apparatus according to a preferred embodiment of the present invention.

An arc suppressor is disposed between the apparatus main terminal 212 and the connector main terminal 112. The arc suppressor comprises a second conductor 266 and a first conductor. The first conductor branches from the second conductor 266. Alternatively, the first conductor is electrically connected to the second conductor 266 through another conductor (not shown). The second conductor 266 has one end electrically connected to the apparatus main terminal 212 and another end 268 dangling under no external force. The first conductor comprises a resistor 270 and a conductive contact 278. The resistor 270 is electrically connected to the second conductor 266. The conductive contact 278 is electrically connected to the resistor 270. The conductive contact 278 dangles under no external force. After the power interconnection apparatus 200 and the DC receptacle 300 have been electrically connected and the main connector (plug) 160 is going to get electrically connected to the power interconnection apparatus 200, the conductive contact 278 comes into contact with the connector main terminal 112 to thereby cause a first current 298 to pass through the first conductor (as shown in FIG. 2) in response to an action in which the connector main terminal 112 is inserted into the apparatus casing hole 412 and positioned at the apparatus casing hole 412; meanwhile, the connector main terminal 112 comes into contact with the conductive contact 278 and the endpoint 268 of the second conductor 266, such that a second current 398 passes through the second conductor 266 (as shown in FIG. 3). The resistor 270 restricts the magnitude of the first current in response to the connector main terminal 112 being positioned at the apparatus casing hole 412. In a preferred embodiment of the present invention, given a DC main of 250V and a resistor 270 of 10 ohms, the magnitude of the first current is restricted to no larger than 25 amperes so as to effectively overcome the drawback of DC inrush current facing the prior art, for instance, if equivalent capacitance $C_Y$ of an AC power supply equals 4.7~6.8 uF, the resistance will equal 300~400 amperes.

In other words, when the conductive contact 278 comes into contact with the connector main terminal 112, it is deemed pre-charging $C_Y$. As indicated by the equation below, given $C_Y$ of 6.8 uF, it takes an instant, say 0.22 ms, to achieve a 240V voltage level, where Vc denotes $C_Y$ voltage, Vo denotes DC main voltage.

$$Vc = Vo \times (1 - e^{-\frac{t}{RC}})$$
$$240 = 250 \times (1 - e^{-\frac{t}{10 \times 6.8 \times 10^{-6}}})$$
$$t = 0.22 \text{ ms}$$

The conductors 236, 236A are made of any conductive material, such as copper, silver, gold, or aluminum. The second conductor 266 is made of any conductive material, such as copper, silver, gold, or aluminum. The conductive contact 278 is made of any conductive material, such as copper, silver, gold, or aluminum. The conductive contact 278 is hemispherical, cylindrical, or sheet-shaped. The endpoint 268 of the second conductor 266 is hook-shaped or sheet-shaped.

FIG. 2 and FIG. 3 are schematic views of an action of a power interconnection apparatus 200 according to a preferred embodiment of the present invention. Referring to FIG. 2, after the power interconnection apparatus 200 and the DC receptacle 300 have been electrically connected, if the user wants to electrically connect the main connector (plug) 160 and the power interconnection apparatus 200, in response to the connector main terminal 112 (and the connector main terminals 116, 120) being inserted into the apparatus casing hole 412 of the power interconnection apparatus 200, the conductive contact 278 comes into contact with the connector main terminal 112, such that the first current 298 passes through the first conductor (which comprises a resistor 270 and a conductive contact 278), because the first conductor comprises the resistor 270, and the resistance of the resistor 270 restricts an instantaneously large current to therefore reduce greatly damage otherwise arising from electric arcs, sparks, or flashover.

Referring to FIG. 3, after the conductive contact 278 has come into contact with the connector main terminal 112 to therefore allow a first current to pass through the first conductor, the user keeps operating the main connector (plug) 160 to position the connector main terminal 112 at the apparatus casing hole 412. At this point in time, the connector main terminal 112 comes into contact with the conductive contact 278 and the second conductor 266, and thus the second current 398 passes through the second conductor 266, wherein the second current 398 is a current for use by conventional electronic products.

In addition to the aforesaid components, FIG. 3 shows a safety wall 308 which is well known among persons skilled in the art and thus is not described in detail herein for sake of brevity. In a preferred embodiment of the present invention, the diagram shows the dimensions of a plug and power interconnection apparatus standardized in accordance with IEC 60320, contact regions, main terminals, and the other components. Furthermore, a 1.5 mm distance 312 between the end 268 of the second conductor 266 and the conductive contact 278 complies with UL 498 specifications of plugs and receptacles. When the rated voltage is equal to or less than 250V, the minimum gap maintained by air or surface is 3/64 inch (1.2 mm).

In another preferred embodiment of the present invention, the power interconnection apparatus 200 is integrated with the DC receptacle 300. Hence, the equivalent components and related functions of the power interconnection apparatus 200 are integrated into the receptacle casing 324 of the DC receptacle 300. Referring to FIG. 1, FIG. 2, and FIG. 3, similarly, after being integrated with the power interconnection apparatus 200, the DC receptacle 300 is adapted to supply a direct current to the main connector (plug) 160. The main connector (plug) 160 has connector main terminals 112, 116, 120. The DC receptacle comprises: a receptacle casing 324; a DC main terminal (not shown); a first conductor comprising a resistor 270 and a conductive contact 278 electrically coupled to the resistor 270; and a second conductor 266 electrically coupled to the DC main terminal. The resistor 270 of the first conductor is electrically coupled to the second conductor 266 (including but not limited to the first conductor branching from the second conductor 266.) In response to an action in which the main connector (plug) 160 is connected to the DC receptacle 300, the connector main terminal 112 comes into contact with the conductive contact 278, such that the magnitude of the first current 298 passing through the first conductor is restricted by the resistor 270, thereby suppressing related damage otherwise caused by an electric arc. Afterward, when the connector main terminal 112 is positioned at the receptacle casing hole 312, the connector main terminal 112 comes into contact with the conductive contact 278 and the endpoint 268, such that the second current 398 passes through the second conductor 266.

Figure 4:
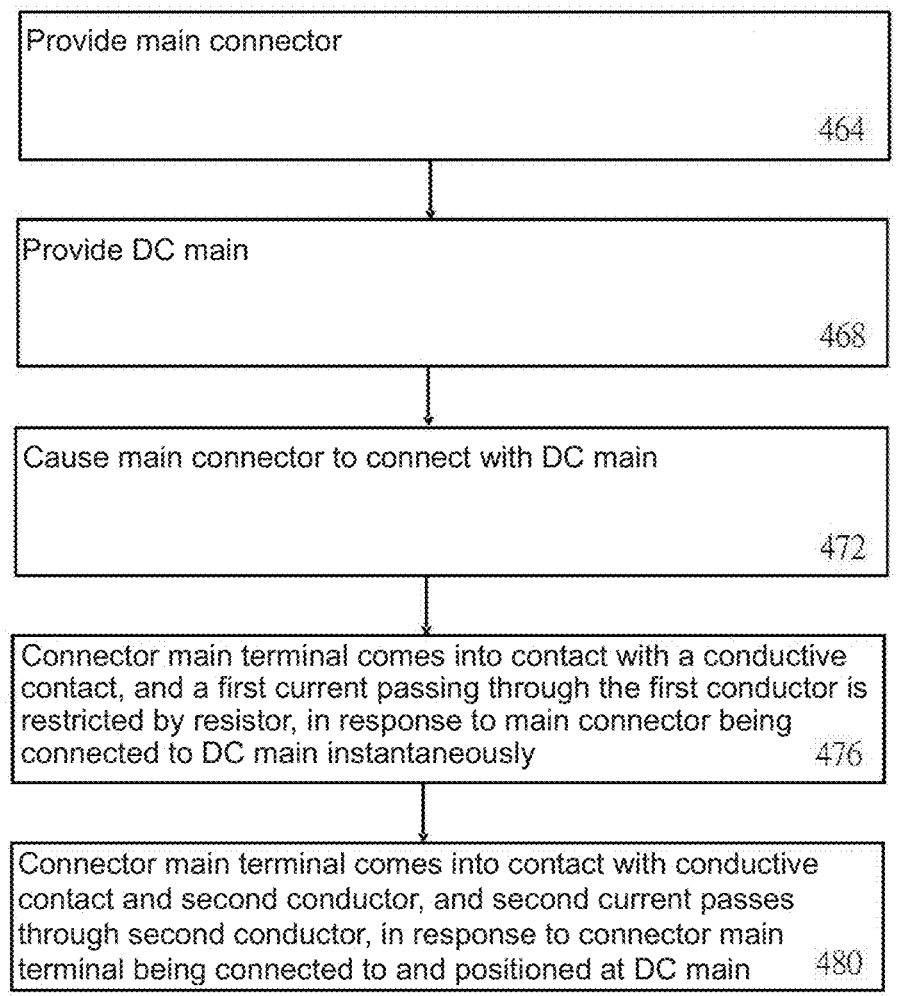
FIG. 4 is a schematic view of the process flow of a method of supplying a direct current according to a preferred embodiment of the present invention.

FIG. 4 illustrates a method 460 of supplying a direct current according to a preferred embodiment of the present invention. The method is adapted for use between a main connector 104 and a DC main 300 and comprises the steps of:

providing the main connector 104 comprising a connector main terminal 112 (step 464);

providing the DC main 300 comprising: a DC main terminal (not shown) for supplying the direct current; a first conductor comprising a resistor 270 and a conductive contact 278 electrically coupled to the resistor 270; and a second conductor 266 with one end electrically coupled to the DC main terminal, wherein the resistor 270 of the first conductor is electrically coupled to the second conductor 266 (step 468);

causing the main connector 104 to connect with the DC main 300 (step 472);

wherein, in response to the main connector 104 being connected to the DC main 300 instantaneously, the connector main terminal 112 comes into contact with the conductive contact 278, and a first current 298 passing through the first conductor is restricted by the resistor 270 (step 476); and wherein, in response to the connector main terminal 112 being connected to and positioned at the DC main 300, the connector main terminal 112 comes into contact with the conductive contact 278 and the second conductor 266, such that a second current 398 passes through the second conductor (step 480).

In this preferred embodiment, the connector main terminals 112, 116, 120 of the main connector (plug) 160 (including but not limited to an AC plug initially designed for use with external AC main input) are freely mounted and dismounted through the receptacle casing holes 312, 316, 320, respectively, so as to supply a DC main to the apparatus 100 having a power supply 104 (including but not limited to an AC power supply.) Hence, the DC receptacle 300 capable of preventing or suppressing damage otherwise arising from electric arcs or sparks is implemented.

In the embodiments of the present invention, an electric arc is not only defined as a phenomenon of discharging through air or an insulating medium but also includes a circuit path or electrical leakage purposefully or inadvertently brought about. Although the energy or current of electric arcs is insufficient for the electric arcs to cross an insulating layer or air gap, the electric arcs are likely to generate heat, damage components, or pose any other problems.

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

What is claimed is:

1. An apparatus for power interconnection, adapted for use between a main connector and a direct current (DC) main, the main connector having a connector main terminal, and the DC main having a DC main terminal, the power interconnection apparatus comprising:
   an apparatus main terminal electrically coupled to the DC main terminal in response to the power interconnection apparatus being connected to the DC main;
   a conductive contact electrically coupled to a resistor via a first electrical conductive path from the DC main to the main connector, the conductive contact located at an entrance to an apparatus casing hole of the power interconnection apparatus; and
   a conductor electrically coupled to the resistor via the first electrical conductive path from the DC main to the main connector, the conductor separated from the conductive contact by a specified distance;
   wherein, in response to a first action in which the main connector is at a first position at the entrance to the apparatus casing hole of the power interconnection apparatus and in contact with the conductive contact, a first current passes from the conductor to the conductive contact via the first electrical conductive path through the resistor that restricts the first current to prevent damage from inrush current and, in response to a second action in which the main connector is inserted through the entrance of the apparatus casing hole to a second position, the connector main terminal contacts both the conductive contact and the conductor that are separated by the specified distance allowing a second current to pass through the conductor to form a second electrical conductive path from the DC main to the main connector providing a power supply.

2. The apparatus of claim 1, wherein the conductive contact dangles in response to the main connector not being connected to the power interconnection apparatus.

3. The apparatus of claim 1, further comprising an apparatus casing, wherein the apparatus casing includes the apparatus casing hole whereby the connector main terminal is mounted and dismounted through the apparatus casing hole.

4. The apparatus of claim 1, wherein the DC main is one of a group consisting of: a solar power main, a battery main, and a capacitor.

5. The apparatus of claim 1, wherein the apparatus is one of a group consisting of: a notebook computer, a tablet, an DVD player, a monitor, a portable electronic apparatus, a mobile phone, a PDA, a server, a home appliance, a measurement instrument, a desktop computer, and an industrial computer, and wherein the DC main is supplied through a DC receptacle, and wherein the DC receptacle is one of a group consisting of: an indoor electrical outlet, an outdoor electrical outlet, and a main extension.

6. The apparatus of claim 1, wherein the conductive contact is made of a conductive material selected from a group consisting of copper, silver, gold, and aluminum, and wherein the conductor is made of a conductive material selected from a group consisting of: copper, silver, gold, and aluminum.

7. The apparatus of claim 1, wherein the first electrical conductive path branches from the conductor.

8. The apparatus of claim 1, further comprising an apparatus casing, wherein the apparatus main terminal protrudes from the apparatus casing.

9. A receptacle structure, adapted to supply a direct current (DC) to a main connector having a connector main terminal, the receptacle structure comprising:

a DC main terminal for supplying the direct current;

a conductive contact electrically coupled to a resistor via a first electrical conductive path from the DC main terminal to the connector main terminal, the conductive contact located at an entrance to a receptacle casing hole of the DC receptacle; and a conductor electrically coupled to the DC main terminal;

wherein the resistor is electrically coupled to the conductor, and wherein, in response to a first action in which the main connector is at a first position at the entrance to the receptacle casing hole of the DC receptacle and in contact with the conductive contact, a first current passes from the conductor to the conductive contact via the first electrical conductive path through the resistor that restricts the first current to prevent damage from inrush current and, in response to a second action in which the main connector is inserted through the entrance of the receptacle casing hole to a second position, the connector main terminal contacts both the conductive contact and the conductor that are separated by a specified distance allowing a second current to pass through the conductor to form a second electrical conductive path from the DC main terminal to the connector main terminal providing a power supply.

10. The receptacle structure of claim 9, wherein the conductive contact dangles in response to the main connector not being connected to the DC receptacle.

11. The receptacle structure of claim 9, further comprising a receptacle casing and a receptacle casing hole disposed on the receptacle casing to allow the connector main terminal to be mounted and dismounted through the receptacle casing hole.

12. The receptacle structure of claim 9, wherein the conductive contact is made of a conductive material selected from a group consisting of: copper, silver, gold, and aluminum, and wherein the conductor is made of a conductive material selected from a group consisting of: copper, silver, gold, and aluminum.

\* \* \* \* \*